US005367558A

United States Patent [19]
Gillig et al.

[11] Patent Number: 5,367,558
[45] Date of Patent: Nov. 22, 1994

[54] CELLULAR CORDLESS TELEPHONE

[75] Inventors: Steven F. Gillig, Roselle; Glen E. Pederson, St. Charles, both of Ill.

[73] Assignee: Motorola, Inc., Schaumburg, Ill.

[21] Appl. No.: 203,711

[22] Filed: Feb. 28, 1994

Related U.S. Application Data

[60] Continuation of Ser. No. 103,169, Aug. 6, 1993, abandoned, which is a continuation of Ser. No. 826,322, Jan. 22, 1992, abandoned, which is a division of Ser. No. 660,180, Feb. 19, 1991, Pat. No. 5,127,042, which is a continuation of Ser. No. 516,375, Apr. 30, 1990, abandoned, which is a division of Ser. No. 249,041, Sep. 23, 1988, Pat. No. 4,989,230.

[51] Int. Cl.$^5$ .......................................... H04M 11/00
[52] U.S. Cl. ......................................... 379/59; 379/58
[58] Field of Search .................. 370/24; 379/56, 58, 379/59, 61, 63; 455/7, 11.1, 73, 89

[56] References Cited

U.S. PATENT DOCUMENTS

| 4,989,230 | 1/1991 | Gillig et al. | 379/59 |
|---|---|---|---|
| 5,117,449 | 5/1992 | Metroka et al. | 379/58 |
| 5,127,042 | 6/1992 | Gillig et al. | 379/59 |
| 5,212,684 | 5/1993 | MacNamee et al. | 370/24 |

Primary Examiner—Curtis Kuntz
Assistant Examiner—William Cumming
Attorney, Agent, or Firm—Rolland R. Hackbart

[57] ABSTRACT

A cellular cordless telephone (10) operates with both a cordless base station (180) and a cellular base station (190) and cellular control terminal (196). In one embodiment (FIG. 2), a cellular cordless telephone (100) includes a cellular transceiver (120), antenna (128), keyboard (140), a display (180), handset (160), and microcomputer (130) together with a cordless transceiver (110) and antenna (118), all of which may be in a single housing. In another embodiment (FIG. 3), a cellular cordless telephone (200) includes a cellular telephone (220) and a cordless telephone transceiver (210) which may be a plugable module. Whenever cellular cordless telephone (10) is within range of cordless base station (180), telephone calls may be made over the cordless radio channel or transferred from the cellular radio channels to the cordless radio channel. If the cellular cordless telephone (10) thereafter moves out of range of the cordless base station (180), telephone calls may be made over the cellular radio channels or transferred from the cordless radio channel to one of the cellular telephone channels.

8 Claims, 7 Drawing Sheets

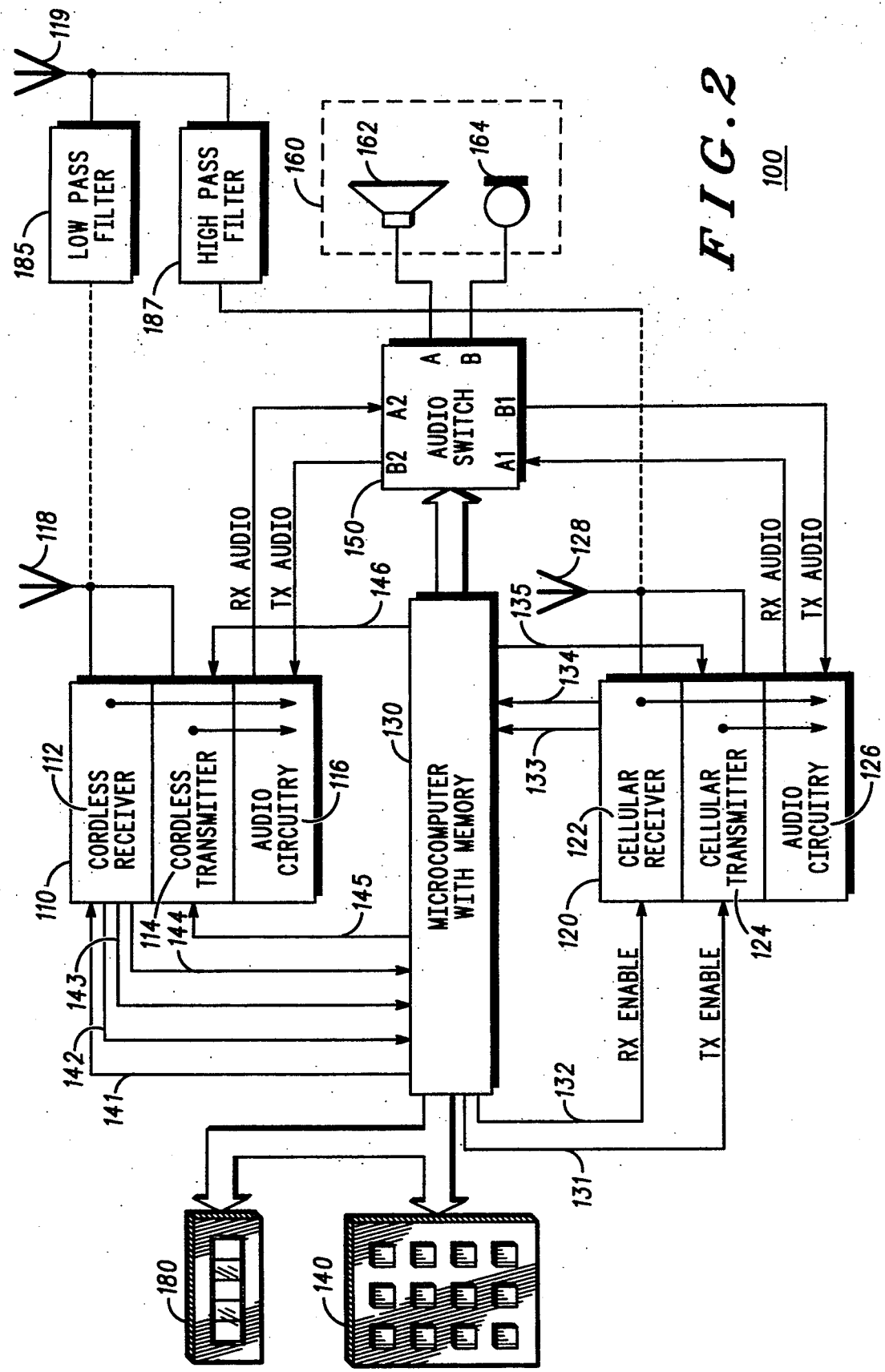

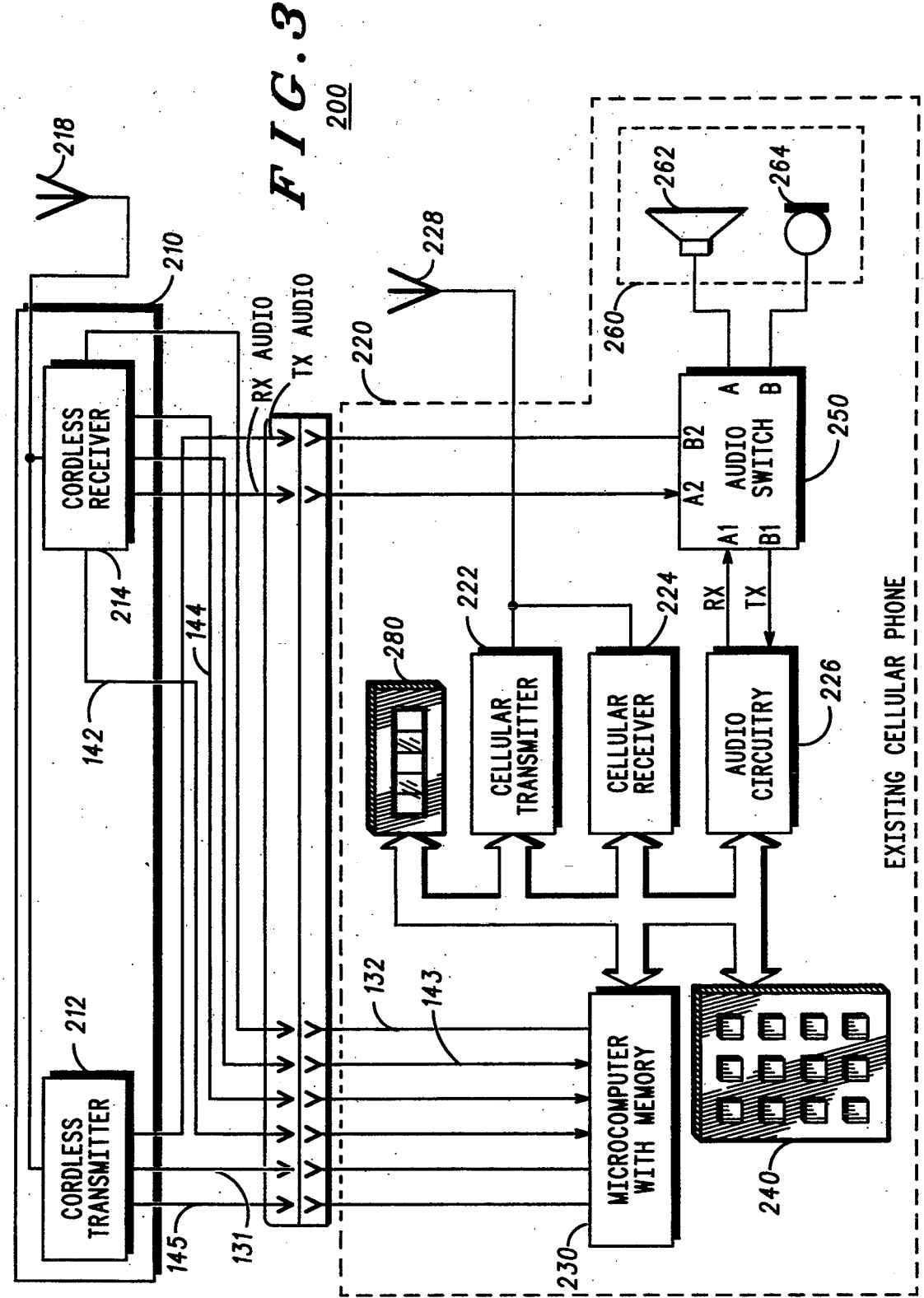

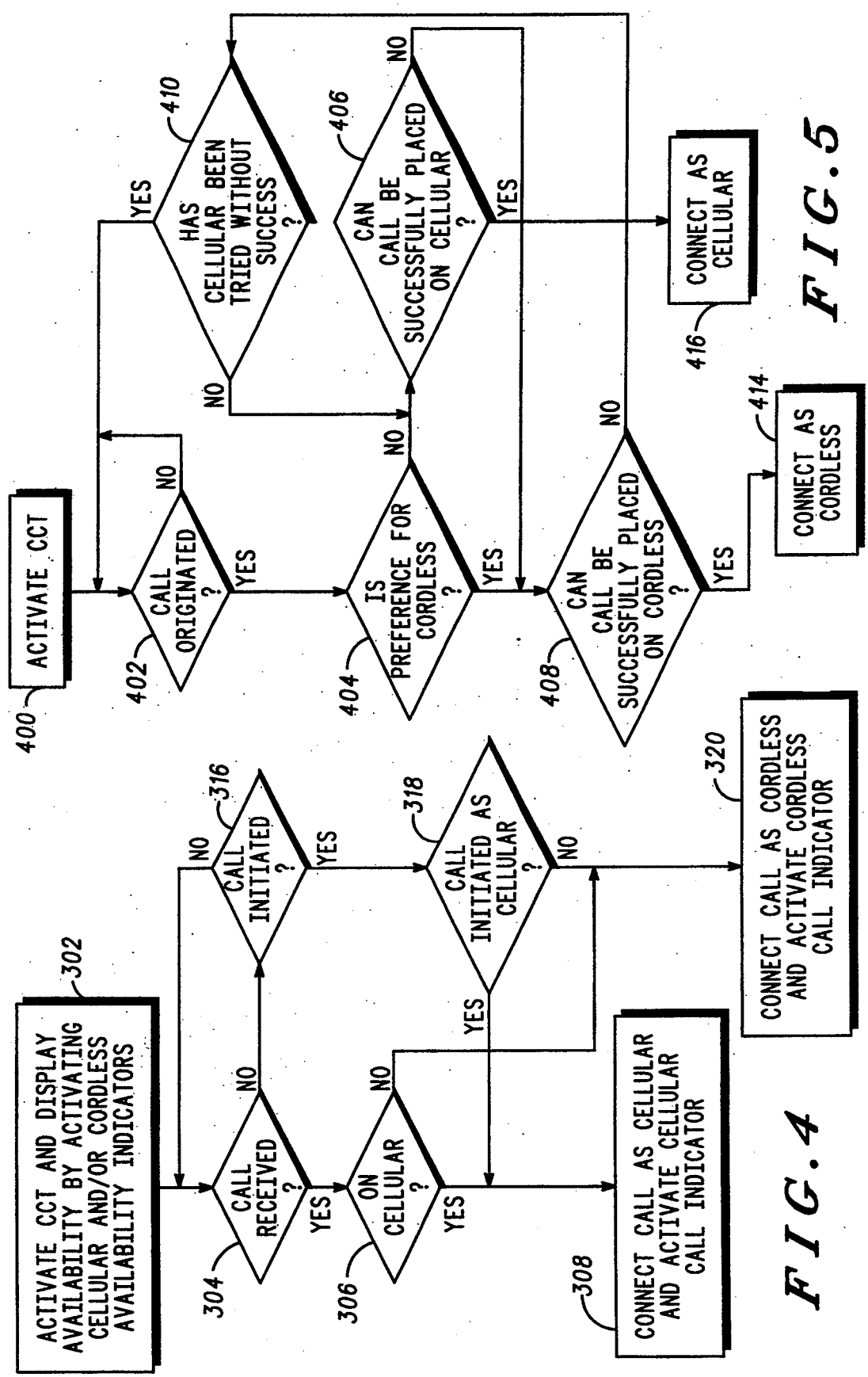

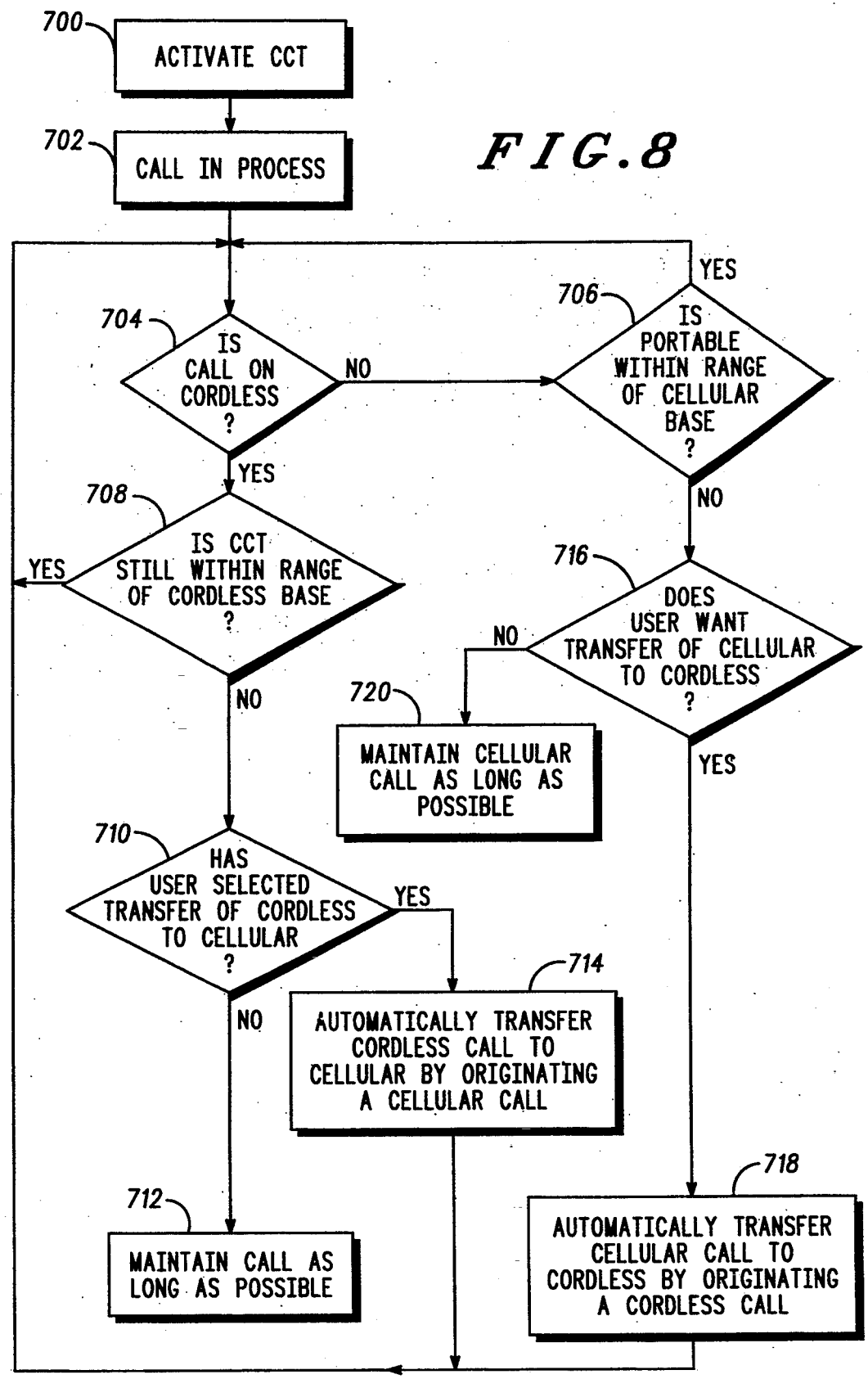

CELLULAR CORDLESS TELEPHONE

This is a continuation of application Ser. No. 08/103,169, filed Aug. 6, 1993 and now abandoned, which is a continuation of application Ser. No. 07/826,322, filed Jan. 22, 1992 and now abandoned, which is a division of application Ser. No. 07/660,180 filed Feb. 25, 1991 and now U.S. Pat. No. 5,127,042, which is a continuation of Ser. No. 07/516,375 filed Apr. 30, 1990 and now abandoned, which in turn is a division of application Ser. No. 07/249,041 filed on Sep. 23, 1988 and now U.S. Pat. No. 4,989,230.

BACKGROUND OF THE INVENTION

The present invention is generally related to cellular telephones and more particularly to an improved cellular cordless telephone for providing both cellular and cordless telephone services.

In the prior art, cordless telephones typically are used in the home to allow the user to place and receive telephone calls at any point throughout the house. Such cordless telephones are connected to the user's telephone landline. However, due to their limited range, such cordless telephones are not suitable for use in vehicles. Vehicular communications are typically achieved by means of radio telephone systems, the most prevalent being cellular telephone systems. A cellular telephone allows the user to place and receive telephone calls at any point throughout a large metropolitan area. However, the cost of a cellular telephone call is as much as seven times the cost of a cordless telephone call, since cordless telephone calls are made by way of the user's telephone landline and cost the same as landline telephone calls, while cellular telephone calls are made by way of expensive cellular base stations and cellular switching equipment and cost much more than landline telephone calls.

OBJECTS OF THE INVENTION

Accordingly, it is an object of the present invention to provide an improved cellular cordless telephone that may place both cellular telephone calls and cordless telephone calls.

It is another object of the present invention to provide an improved cellular cordless telephone that automatically operates as a cordless telephone whenever it is in range of its corresponding cordless base station.

BRIEF DESCRIPTION OF THE DRAWINGS

FIG. 2 is a block diagram of a cellular cordless telephone embodying the present invention.

FIG. 3 is a block diagram of another embodiment of a cellular cordless telephone according to the present invention.

FIG. 4 is a flow chart for the process used by the cellular cordless telephones in FIGS. 2 and 3 for placing and receiving cellular and cordless telephone calls.

FIG. 5 is a flow chart for the process used by the cellular cordless telephones in FIGS. 2 and 3 for originating a telephone call as a cellular telephone call or a cordless telephone call according to user selectable preference.

FIG. 8 is a flow chart for the process used by the cellular cordless telephones in FIGS. 2 and 3 for automatically transfering between a cellular telephone call and a cordless telephone call.

DESCRIPTION OF THE PREFERRED EMBODIMENT

Figure 1:
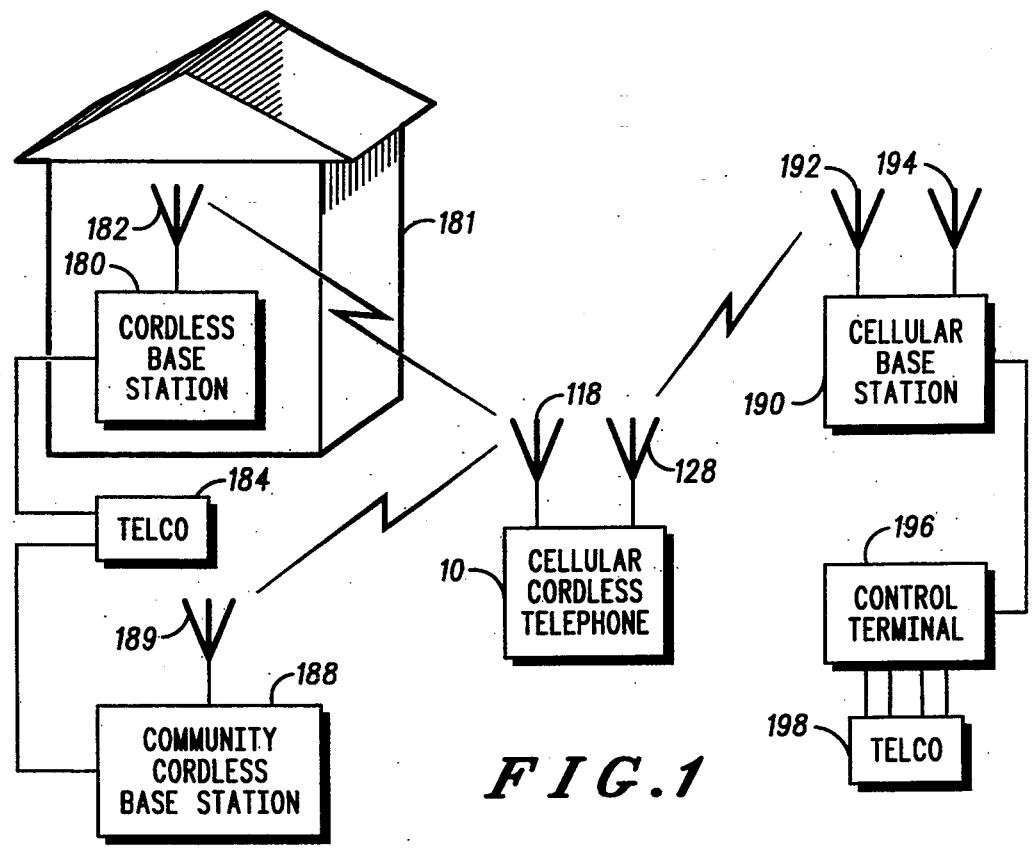
FIG. 1 is a block diagram of a cellular cordless telephone system embodying the present invention.

In FIG. 1, there is illustrated a block diagram of a cellular cordless telephone system embodying the present invention. The system includes a telephone company phone system (TELCO) 184, connected by telephone landlines to a cordless base station 180 having a landline telephone number located in a home or office 181 and to a community cordless base station 188 having a landline telephone number in another office, building, or other geographical location. Cordless base stations 180 and 188 communicate with the cellular cordless telephone (CCT) 10 through antennas 182 and 189. Antennas 182 and 189 may be implemented as telescoping whip antennas. Cordless base stations 180 and 188 may be any conventional cordless base station, such as, for example, the base station shown and described in Panasonic operating instructions, entitled "Cordlessphone Model No. KX-T3000 EASA-PHONE", published by and available from the Panasonic Company, One Panasonic Way, Secaucus, N.J., 07094. Additional community cordless base stations 188 may be located throughout a metropolitan area for providing shared telephone service to CCTs 10. In this case, cordless base station 188 may include additional equipment for billing calls to the cellular telephone number of CCT 10.

Also connected through telephone landlines to the same or a different telephone company phone system (TELCO) 198 is the cellular control terminal 196 (see U.S. Pat. No. 4,268,722) with its associated cellular base station(s) 190 (see U.S. Pat. No. 4,485,486 incorporated herein by reference). Cellular base station 190 incorporates both a receive antenna 192 and a transmit antenna 194 (see U.S. Pat. No. 4,369,520 incorporated herein by reference) for communicating with CCTs 10.

CCT 10 may be a mobile unit installed in a vehicle, a transportable unit which is a mobile unit and battery installed in a carrying case, or a hand-held portable unit. CCT 10 includes an antenna 118 for the cordless radio channels and an antenna 128 for the cellular radio channels as illustrated by the embodiment of CCT 200 in FIG. 3, or may include a single antenna, is illustrated by the embodiment of CCT 100 in FIG. 2. In the U.S.A., the cordless radio channels are in the frequency band from 46–49 mHz and the cellular radio channels are in the frequency band from 824–894 mHz.

In FIG. 2, there is illustrated a detailed block diagram of a first embodiment of a CCT 100 according to the present invention. CCT 100 includes a cordless telephone transceiver 110, antenna 118, cellular telephone transceiver 120, antenna 128, microcomputer 130 with memory, keypad 140, display 180, audio switch 150, and handset 160 including speaker 162 and microphone 164. Alternatively, as shown by dashed-lines in FIG. 2, cordless telephone transceiver 110 and cellular telephone transceiver 120 may be coupled to a single antenna 119 in place of antennas 118 and 128 by way of low-pass filter 185 and high-pass filter 187, respectively. Cordless telephone transceiver 110 may be any conventional cordless telephone transceiver, such as, for example the transceiver shown and described in the aforementioned Panasonic operating instructions, entitled "Cordlessphone Model No. KX-T3000 EASA-PHONE". Cellular telephone transceiver 120, microcomputer 130, keypad 140, and handset 160 likewise may be any commercially available cellular transceiver, such as, for example, the transceiver shown and described in Motorola instruction manual number 68P81049E55, entitled "DYNATAC Cellular Mobile Telephone", published by and available from Motorola C & E Parts, 1313 East Algonquin Road, Schaumburg, Ill. 60196.

Figure 9:
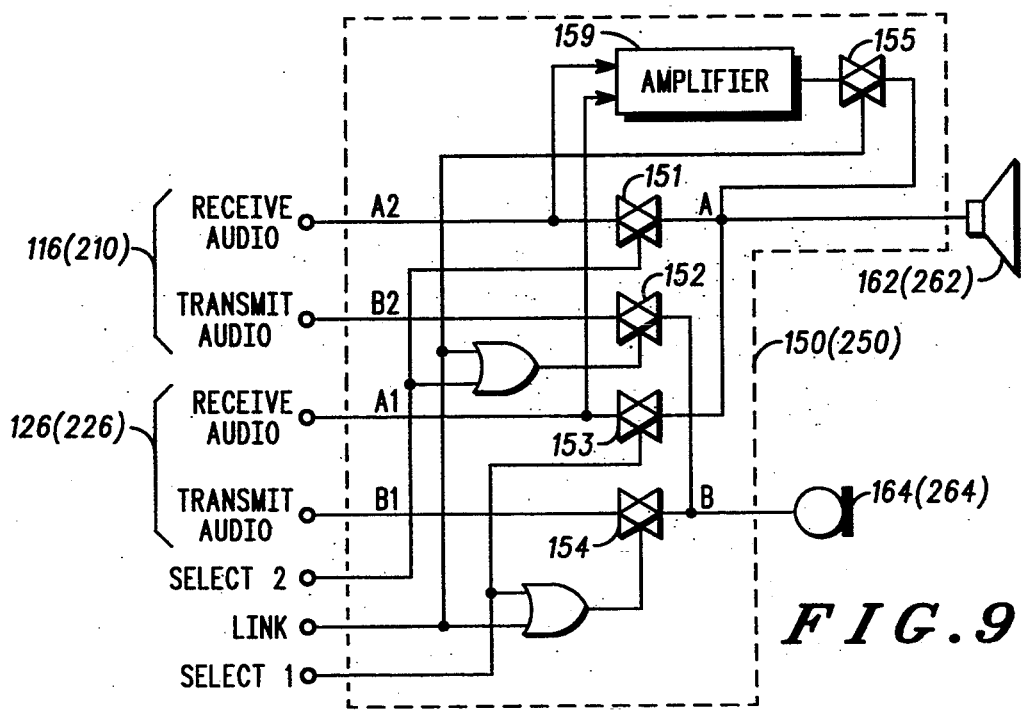
FIG. 9 is a block diagram of audio switch 150 in the cellular cordless telephone in FIG. 2.

Referring to FIG. 9, audio switch 150 may be implemented with two-to-one multiplexing analog switches 151–155 which select between audio signals of audio circuitry 116 in cordless transceiver 110 and audio circuitry 126 in cellular transceiver 120 under control of select signals SELECT1, SELECT2 and LINK from microcomputer 130. Select signal SELECT2 enables switches 151 and 152 when it has a binary one state, select signal SELECT1 enables switches 153 and 154 when it has a binary one state, and select signal LINK enables switches 152, 154 and 155 when it has a binary one state. Depending on which is enabled, analog switches 151 and 153 couple speaker 162 to receive audio from audio circuitry 116 and audio circuitry 126, respectively. Similarly, depending on which is enabled, analog switches 152 and 154 couple microphone 164 to transmit audio of audio circuitry 116 and audio circuitry 126, respectively. If three-way linking is selected, analog switches 152 and 154 couple microphone 164 to transmit audio of both audio circuitry 116 and audio circuitry 126, and analog switch 155 couples speaker 162 to receive audio of both audio circuitry 116 and audio circuitry 126 by way of summing amplifier 159.

Referring to CCT 100 in FIG. 2, microcomputer 130 is programmed in accordance with FIGS. 4–8 for operating as a cellular telephone, a cordless telephone, or a cellular cordless telephone. That is, according to the present invention, CCT 100 may simultaneously operate as a cellular telephone and a cordless telephone. When operating as a cellular telephone, control signals 131 TX ENABLE and 132 RX ENABLE of microcomputer 130 enable cellular transmitter 124 and cellular receiver 122, respectively. In addition to control signals 131 and 132 to cellular transceiver 120, microcomputer 130 also monitors control signals 133 RSSI, 134 RX DATA and 135 TX DATA for detecting signal strength, for detecting receive data and for sending transmit data, respectively, used in operation of cellular transceiver 120. When operating as a cordless telephone, control signals 141 and 146 of microcomputer 130 enable cordless receiver 112 and cordless transmitter 114, respectively. In addition to control signals 141 and 146 to cordless transceiver 110, microcomputer 130 also monitors control signals 142 SIGNAL QUALITY, 143 RING, 144 RX SECURITY CODE and 145 TX SECURITY CODE for detecting signal strength, ringing, and the receive security code, and for sending the transmit security code and dialed digits, respectively, used in operation of cordless transceiver 110. Dialed digits may also be encoded by keypad 140 as conventional multi-frequency tones which are coupled to transmit audio of cordless transceiver 110 by audio switch 150 during cordless operation.

Referring next to FIG. 3, there is illustrated a block diagram of another embodiment of a cellular cordless telephone (CCT) 200 according to the present invention. CCT 200 includes a cordless telephone transceiver 210 in a separate housing with antenna 218 and connector 270, and a cellular telephone 220 in a separate housing with antenna 228 and connector 272. Cordless telephone transceiver 210 may be a plug-in accessory which couples via connectors 270 and 272 to cellular telephone 220. When cordless telephone transceiver 210 is plugged into microcomputer 230 of cellular telephone 220, it operates in accordance with FIGS. 4–8. Cellular telephone 220 includes cellular transmitter 222, cellular receiver 224, microcomputer 230 with memory, keypad 240, display 280, audio circuitry 226, audio switch 250 and handset 260 including speaker 262 and microphone 264. Cordless telephone transceiver 210 may be any conventional cordless telephone transceiver, such as, for example the transceiver shown and described in the aforementioned Panasonic operating instructions, entitled "Cordlessphone Model No. KX-T3000 EASA-PHONE". Cellular telephone 220 likewise may be any commercially available cellular transceiver, such as, for example, the transceiver shown and described in the aforementioned Motorola instruction manual number 68P81049E55, entitled "DYNATAC Cellular Mobile Telephone".

Microcomputer 230 of cellular telephone 220 is coupled to the cordless telephone transceiver 210 via the same control signals used in FIG. 2. These control signals are TX/RX enable signals 131/132, signal quality signal 142, ring signal 143 and TX/RX security code signals 145/144.

Audio circuitry 226 of cellular telephone 220 is coupled to audio switch 250 which can be implemented with two-to-one multiplexing analog switches (see FIG. 9) which select between audio signals from audio circuitry 226 and cordless telephone transceiver 210.

Referring now to FIG. 4, there is illustrated a flow chart for the process used by the CCTs 100 and 200 in FIGS. 2 and 3, respectively, for placing and receiving cellular and cordless telephone calls. Entering at block 302, the user activates the CCT. The microcomputer 130 and 230 monitors both the cellular and cordless systems for availability thereof and for incoming and outgoing calls. If the cellular system and/or cordless system are available, a corresponding availability indicator is enabled in display 180 and 280. In cellular systems, the microcomputer scans pre-selected signalling channels to determine if cellular service is available. Next, at decision block 304, a check is made to determine if a call has been received. If not, NO branch is taken to decision block 316 to determine if a call has been initiated by the user of the CCT. If not, NO branch is taken back to block 304 to continue monitoring both the cellular and cordless systems for telephone calls.

Returning to decision block 304, if an incoming call has been received, YES branch is taken to decision block 306 where a check is made to determine if the incoming call is a cellular call. If so, YES branch is taken to block 308 where a cellular call indicator is activated or entered in display 180 and 280, and the incoming call is connected as a cellular call (e.g., in FIG. 2, cellular transceiver 120 is enabled by microcomputer 130). If the incoming call is not a cellular call, NO branch is taken from block 306 to block 320 where a cordless call indicator is activated or entered in display 180 and 280, and the incoming call is connected as a cordless call (e.g., in FIG. 2, cordless transceiver 110 is enabled by microcomputer 130).

Returning to decision block 316, if a call has been initiated by the user of the CCT, YES branch is taken to decision block 318 where a check is made to determine if the initiated call is a cellular call. If so, YES branch is taken to block 308 where the initiated call is connected as a cellular call. If the initiated call is not a cellular call, NO branch is taken from decision block 318 to block 320 where the initiated call is connected as a cordless call.

Referring now to FIG. 5, there is illustrated a flow chart for the process used by the CCTs 100 and 200 in FIGS. 2 and 3, respectively, for originating a telephone call as a cellular telephone call or a cordless telephone call according to user selectable preference stored in the memory of microcomputers 130 and 230.

Entering at block 400, the user activates the CCT. Next, at block 402, a check is made to determine if a call has been originated by the CCT. If not, NO branch is taken to wait for a call to be originated. If a call has been originated, YES branch is taken from decision block 402 to decision block 404, where a check is made to determine if the user's preference is for cordless phone operation. If not, NO branch is taken to block 406 to determine if a call can be placed on the cellular system. If so, YES branch is taken to block 416 where the call origination is connected as a cellular call. If not, NO branch is taken to decision block 408 to determine if a call can be successfully placed on the cordless system. Referring back to decision block 404, if preference is for cordless, YES branch is also taken to decision block 408. If a cordless call can be successfully placed, YES branch is taken from decision block 408 to decision block 414 where the call is connected as a cordless call. If not, NO branch is taken to decision block 410 to determine if a call had been tried unsuccessfully on the cellular system. If so, YES branch is taken to block 402 to wait for a call origination. If not, NO branch is taken to decision block 406 to determine if the call can be placed on the cellular system.

Figure 6:
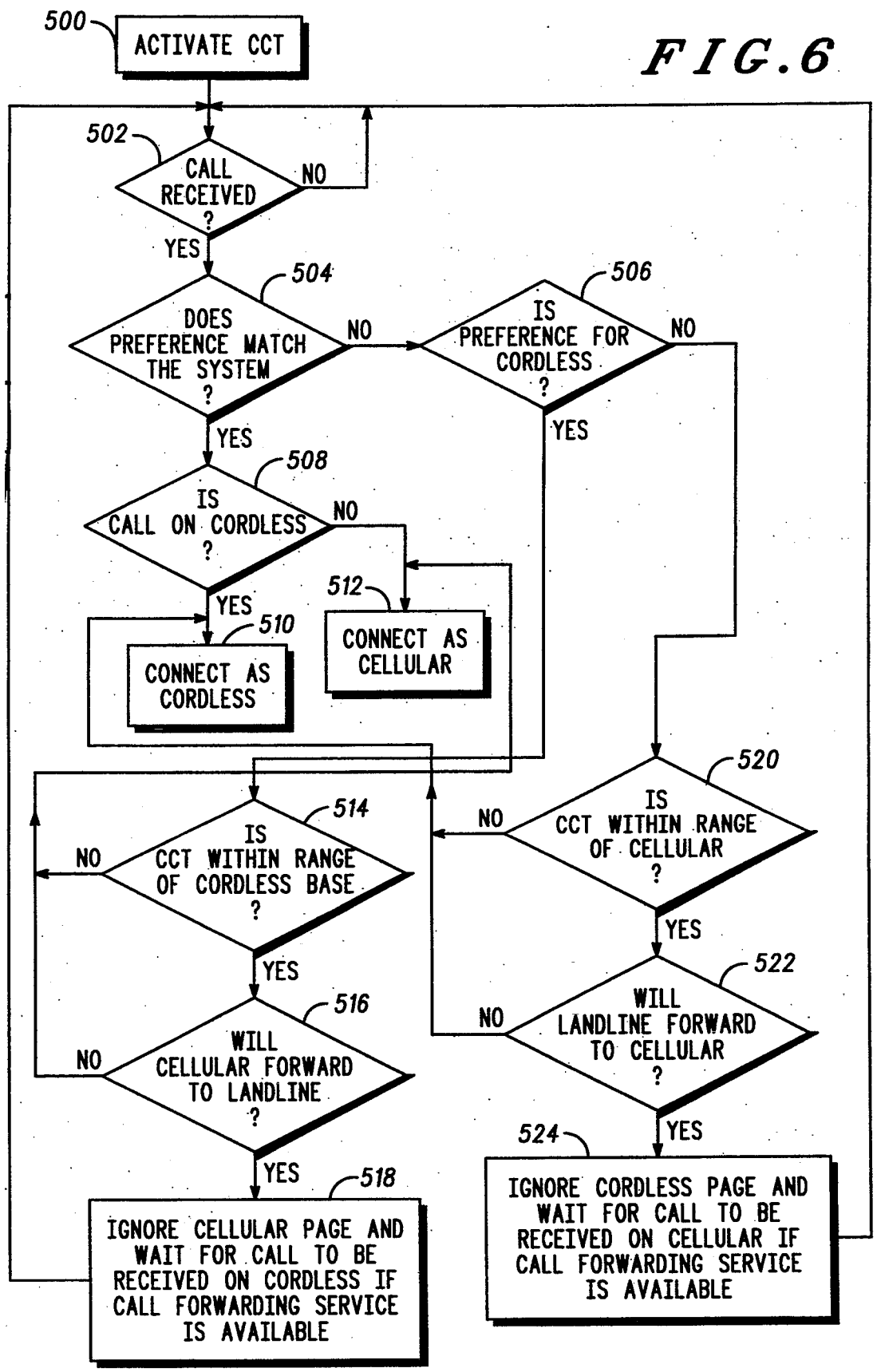
FIG. 6 is a flow chart for the process used by the cellular cordless telephones in FIGS. 2 and 3 for receiving a telephone call as a cellular telephone call or a cordless telephone call according to user selectable preference.

Referring now to FIG. 6, there is illustrated a flow chart for the process used by the CCTs 100 and 200 in FIGS. 2 and 3, respectively, for receiving a telephone call as a cellular telephone call or a cordless telephone call according to user selectable preference stored in the memory of microcomputers 130 and 230.

Entering at block 500, the user activates the CCT. Next, at decision block 502, a check is made to determine if a call is being received by the CCT. If not, NO branch is taken back to decision block 502. If a call has been received, YES branch is taken from decision block 502 to decision block 504 to determine if the user's system preference matches the system of the incoming call. If so, YES branch is taken to decision block 508 to determine if the call is on the cordless system. If so, the YES branch is taken to block 510 where the incoming call is connected as a cordless call. If not, the NO branch is taken to block 512 where the incoming call is connected as a cellular call.

Returning to decision block 504, if the user's system preference does not match the system of the incoming call, NO branch is taken to decision block 506 to determine if the preference is for the cordless system. If so, the YES branch is taken to decision block 514 to determine if the CCT is within range of the cordless base station (e.g., by sending the transmit security code and waiting for the receive security code from the cordless base station). If not, the NO branch is taken to block 512 where the incoming call is connected as a cellular call. If the cellular cordless telephone is within range of the cordless base station, YES branch is taken from decision block 514 to decision block 516 to determine if the cellular system will forward the unanswered incoming call to the landline of the cordless base station when the cellular phone cannot be reached. This type of service is generally referred to as "call forwarding" (a process which redirects a call from the dialed cellular telephone number of CCT 10 to the landline telephone number of cordless base station 180) and can be determined by polling stored information in the memory associated with the CCT microcomputer. If call forwarding service is not available, NO branch is taken to block 512 where the incoming call is connected as a cellular call. If the cellular system will forward the unanswered incoming call, YES branch is taken from decision block 516 to block 518 where the cellular page from the cellular base station is ignored and thereafter to decision block 502 to wait for the incoming call to be received as a cordless call.

Returning to decision block 506, if the preference is for a cellular call, NO branch is taken to decision block 520 to determine if the CCT is within range of the cellular base stations (does it have cellular service). This is typically determined by scanning and selecting the strongest signalling channel from the surrounding cellular base stations. If not, NO branch is taken to block 510, where the incoming call is connected as a cordless call. If the CCT is within range of the cellular base stations, YES branch is taken from decision block 520 to decision block 522 to determine if the landline system will forward the unanswered incoming call to the cellular system. This type of service is generally referred to as "call forwarding" (a process which redirects a call from the dialed landline telephone number of cordless base station 180 to the cellular telephone number of CCT 10) and can be determined by polling stored information in the memory associated with the CCT microcomputer. If call forwarding service is not available, NO branch is taken to block 510 where the incoming call is connected as a cordless call. If the landline telephone system will forward the unanswered incoming call, YES branch is taken from decision block 522 to block 524 where the cordless page from the cordless base Station is ignored and thereafter back to decision block 502 to wait for the incoming call to be received as a cellular call.

Figure 7:
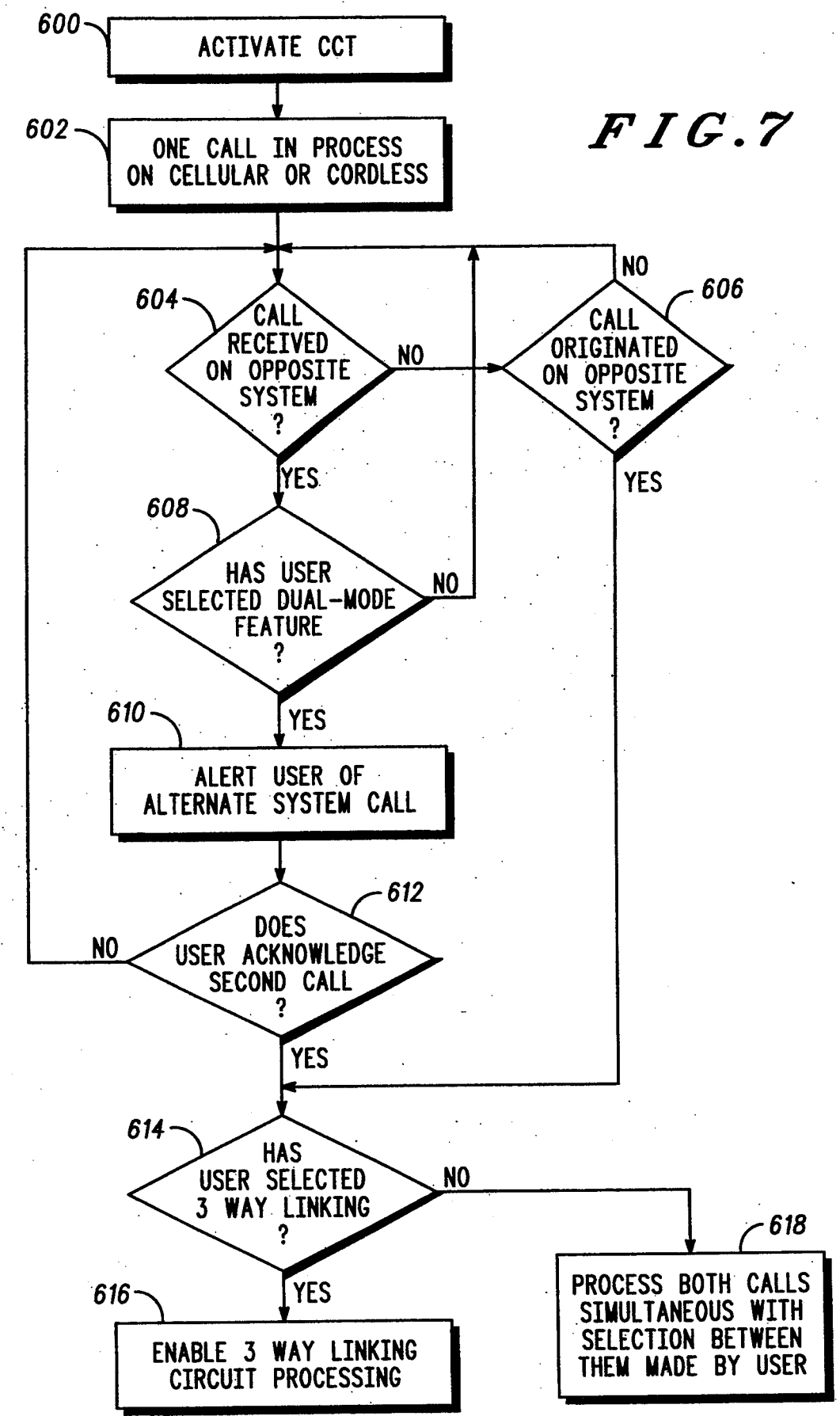
FIG. 7 is a flow chart for the process used by the cellular cordless telephones in FIGS. 2 and 3 for simultaneously processing both a cellular telephone call and a cordless telephone call and three-way linking both calls.

Referring now to FIG. 7, there is illustrated a flow chart for the process used by the CCTs 100 and 200 in FIGS. 2 and 3, respectively, for simultaneously processing both a cellular telephone call and a cordless telephone call and, if desired, three-way linking both calls.

Entering at block 600, the user activates the CCT. Next, at block 602, one call is assumed to be in process on either the cellular system or cordless system. Proceeding from block 602 to decision block 604, a check is made to determine if a call has been received on the opposite system from the call in process. If so, YES branch is taken to decision block 608 to determine if the user has selected the dual-mode feature (e.g., by entering a predetermined code from the keypad). If not, NO branch is taken back to decision block 604 and the current call remains in process. If the user has selected the dual-mode feature, YES branch is taken from decision block 608 to block 610 which alerts the user of an incoming call on the alternate system. This type of service is generally referred to as "call waiting". Next, at decision block 612, a check is made to see if the user acknowledges the second call. If not, NO branch is taken back to decision block 604 and the current call remains in process. If the user acknowledges the second call (e.g., by flashing the hookswitch), YES branch is taken from decision block 612 to decision block 614 to determine if the user has selected three-way linking (e.g., by entering a predetermined code from the keypad). If so, YES branch is taken to block 616 which enables three-way linking of the user and the two calls, each of which is on a different system. Three-way linking may be accomplished by switchably coupling the combined receive audio signals from summing amplifier 159 via analog gate 155 to the speaker, and enabling both transmit audio switches 152 and 154 in FIG. 9. If the user has not selected three-way linking, NO branch is taken from decision block 614 to block 618 to process both calls simultaneously, one over each system, but selection between them is made by the user so that only one party is in conversation with the user at a time. Selection between the calls may be made pressing a pre-selected key or set of keys on the keypad.

Returning to decision block 604, if a call has not been received on the opposite system, NO branch is taken to decision block 606 to determine if a call has been originated on the opposite system. If not, NO branch is taken back to decision block 604. If a call has been originated on the opposite system, YES branch is taken from decision block 606 to decision block 614 to determine if the user wants three-way linking, as described hereinabove.

Referring now to FIG. 8, there is illustrated a flow chart for the process used by the CCTs 100 and 200 in FIGS. 2 and 3, respectively, for automatically transferring between a cellular telephone call and a cordless telephone call.

Entering at block 700, the user activates the CCT. Next at block 702, a call is assumed to be in process on one of the two systems. Proceeding from block 702 to decision block 704, a check is made to determine if the call in process is on the cordless system. If so, YES branch is taken to decision block 708 to determine if the OCT is still within range of the cordless base stations (e.g., signal quality is good). If so, YES branch is taken back to decision block 704. If the cellular cordless telephone is out of range of the cordless base stations, NO branch is taken from decision block 708 to decision block 710 to determine if the user has selected transfer of the cordless call to the cellular system (e.g., by entering a predetermined code from the keypad). If so, YES branch is taken to block 714 where an attempt is made to transfer the cordless call to the cellular system. Assuming the called party has "call waiting", the transfer is attempted by originating another call on the cellular system and waiting for the called party to answer. Thereafter, the path returns to decision block 704. If the user has not selected call transfer, NO branch is taken from decision block 710 to block 712 where the cordless call is maintained as long as possible.

Returning to decision block 704, if the call is not on the cordless system, NO branch is taken to decision block 706 to determine if the CCT is still within range of the cellular base stations (e.g., signal quality is good). If so, YES branch is taken back to decision block 704. If the CCT is out of range of the cellular base stations, NO branch is taken from decision block 706 to decision block 716 to determine if the user has selected transfer of the cellular call to the cordless system (e.g., by entering a predetermined code from the keypad). If not, NO branch is taken to block 720 where the cellular call is maintained as long as possible. If the user has selected call transfer, YES branch is taken from decision block 716 to block 718 where an attempt is made to transfer the cellular call to the cordless system. Assuming the called party has "call waiting", the transfer is attempted by originating another call on the cordless system and waiting for the called party to answer. Thereafter, the path returns to decision block 704.

In summary, a unique cellular cordless telephone has been described that may be advantageously utilized for making both cellular telephone calls and cordless telephone calls. Whenever the cellular cordless telephone is within range of the cordless base station, telephone calls are preferably originated on the cordless system, or if currently in process, are transferred to the cordless telephone system.

We claim:

1. A method of re-establishing telephone communications between a called telephone number and a cellular cordless telephone on one of a cellular telephone system and a cordless telephone system when call transfer has been selected by the user thereof during a telephone call, said cellular cordless telephone having a cellular transceiver and a cordless transceiver and originating and receiving cellular telephone calls on cellular radio channels of a cellular telephone system and cordless telephone calls on at least one cordless radio channel of a cordless base station coupled to a telephone landline having a landline telephone number, said method comprising the steps of:

monitoring the signal quality of said telephone call on said one of said cellular telephone system and said cordless telephone system;

determining if at least one radio channel is available for a call on the other one of said cellular telephone system and said cordless telephone system;

determining if call transfer has been selected; and automatically originating another telephone call to said called telephone number on said other one of said cellular telephone system and said cordless telephone system determined to have at least one available radio channel, in response to a predetermined change in the signal quality of said telephone call and a determination that call transfer has been selected.

2. The method according to claim 1, wherein said cordless base station includes a cordless base station radio, said cellular telephone system includes at least one cellular base station radio, and said step of monitoring the signal quality of said telephone call includes the step of:

monitoring the signal strength of the cordless base station radio and the signal strength of the cellular base station radio.

3. The method according to claim 1, wherein said cellular cordless telephone further includes first and second call indicating means, said method further including the step of activating the first call indicating means during a cellular telephone call and the second call indicating means during a cordless telephone call.

4. A method of maintaining telephone communications between a called telephone number and a cellular cordless telephone on one of a cellular telephone system and cordless telephone system when call transfer has been selected by the user thereof during a telephone call, said cellular cordless telephone having a cellular transceiver and a cordless transceiver and originating and receiving cellular telephone calls on cellular radio channels of a cellular telephone system and cordless telephone calls on at least one cordless radio channel of a cordless base station coupled to a telephone landline having a landline telephone number, said cellular cordless telephone including first and second system indicating means for indicating when the cellular telephone system and the cordless telephone system, respectively, are available, said method comprising the steps of:

monitoring the signal quality of said telephone call on said one of said cellular telephone system and said cordless telephone system;

determining if at least one radio channel is available for a call on the other one of said cellular telephone system and said cordless telephone system;

activating one of the first and second system indicating means corresponding to said other one of said cellular telephone system and said cordless telephone system determined to have at least one available radio channel;

determining if call transfer has been selected; and automatically originating another telephone call to said called telephone number on said other one of said cellular telephone system and said cordless telephone system determined to have at least one available radio channel, in response to a predetermined change in the signal quality of said telephone call and a determination that call transfer has been selected.

5. The method according to claim 4, wherein said cellular cordless telephone further includes first and second call indicating means, said method further including the step of activating the first call indicating means during a cellular telephone call and the second call indicating means during a cordless telephone call.

6. The method according to claim 4, wherein said cordless base station includes a cordless base station radio, said cellular telephone system includes at least one cellular base station radio, and said step of monitoring the signal quality of said telephone call includes the step of:

monitoring the signal strength of the cordless base station radio and the signal strength of the cellular base station radio.

7. The method according to claim 1, further including the step of maintaining said telephone call if call transfer has not been selected.

8. The method according to claim 4, further including the step of maintaining said telephone call if call transfer has not been selected.

* * * * *